United States Patent
Fu

(10) Patent No.: US 11,258,723 B2
(45) Date of Patent: Feb. 22, 2022

(54) DATA PROCESSING METHOD AND APPARATUS, AND SWITCHING DEVICE USING FOOTPRINT QUEUES

(71) Applicant: HUAWEI TECHNOLOGIES CO., LTD., Guangdong (CN)

(72) Inventor: Binzhang Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 16/722,215

(22) Filed: Dec. 20, 2019

(65) Prior Publication Data

US 2020/0127934 A1 Apr. 23, 2020

Related U.S. Application Data

(63) Continuation of application No. PCT/CN2017/090812, filed on Jun. 29, 2017.

(30) Foreign Application Priority Data

Jun. 23, 2017 (WO) ............... PCT/CN2017/089877

(51) Int. Cl.
*H04L 12/863* (2013.01)
*H04L 12/26* (2006.01)
(Continued)

(52) U.S. Cl.
CPC ...... *H04L 47/6255* (2013.01); *H04L 43/0882* (2013.01); *H04L 45/742* (2013.01); *H04L 45/745* (2013.01)

(58) Field of Classification Search
None
See application file for complete search history.

(56) References Cited

U.S. PATENT DOCUMENTS 5,493,566 A 2/1996 Ljungberg et al.
6,389,017 B1 5/2002 Patel et al.
(Continued)

FOREIGN PATENT DOCUMENTS

CN 102638400 A 8/2012
CN 103795648 A 5/2014
(Continued)

OTHER PUBLICATIONS

N. McKeown et al., "Achieving 100% throughput in an input-queued switch,"IEEE Transactions on Communications, vol. 47, No. 8, Aug. 1999. pp. 1260-1267.
(Continued)

*Primary Examiner* — Anh Ngoc M Nguyen

(57) ABSTRACT

This application discloses a data processing method and apparatus, and a switching device. The data processing method includes: obtaining a destination address of a data packet received by an input port; determining an available output port based on the destination address; determining a busy degree of the available output port, when there is no non-busy available output port in the available output port, determining a quantity of footprint queues on the available output port, and selecting an available output port with a largest quantity of footprint queues as a target output port; determining a busy degree of a queue on the target output port, and when there is no non-busy queue on the target output port, selecting a footprint queue on the target output port as a target output queue. In the foregoing manners, a network resource is properly used, and network blocking can be effectively alleviated.

16 Claims, 12 Drawing Sheets

(51) Int. Cl.
*H04L 12/747* (2013.01)
*H04L 12/741* (2013.01)

(56) References Cited

U.S. PATENT DOCUMENTS

| | | | |
|---|---|---|---|
| 2011/0149729 A1 | 6/2011 | Benner et al. | |
| 2012/0087375 A1* | 4/2012 | Rhee | H04L 49/101 |
| | | | 370/401 |
| 2015/0295842 A1 | 10/2015 | Han | |
| 2017/0048144 A1 | 2/2017 | Liu | |
| 2017/0315455 A1* | 11/2017 | Yang | H01J 37/3174 |
| 2017/0339071 A1* | 11/2017 | Cheng | H04L 49/25 |

FOREIGN PATENT DOCUMENTS

| | | |
|---|---|---|
| CN | 105871742 A | 8/2016 |
| EP | 1364552 A1 | 11/2003 |
| JP | H08504554 A | 5/1996 |
| JP | 2003069622 A | 3/2003 |
| JP | 2004236050 A | 8/2004 |
| JP | 2007053564 A | 3/2007 |
| JP | 2016501475 A | 1/2016 |
| WO | 02069668 A1 | 9/2002 |

OTHER PUBLICATIONS

J. Duato et al., "A new scalable and cost-effective congestion management strategy for lossless multistage interconnection networks," Proceedings of the 11th Int'l Symposium on High-Performance Computer Architecture (HPCA-11 2005). Total 12 pages.

Roberto Penaranda et al. "Hol-blocking avoidance routing algorithms in direct topologies", 2014 IEEE, pp. 11-18.

* cited by examiner

DATA PROCESSING METHOD AND APPARATUS, AND SWITCHING DEVICE USING FOOTPRINT QUEUES

CROSS-REFERENCE TO RELATED APPLICATIONS

This application is a continuation of International Application No. PCT/CN2017/090812, filed on Jun. 29, 2017, which claims priority to International Patent Application No. PCT/CN2017/089877, filed on Jun. 23, 2017. The disclosures of the aforementioned applications are hereby incorporated by reference in their entireties.

TECHNICAL FIELD

This application relates to the field of information technologies, and in particular, to a data processing method and apparatus, and a switching device.

BACKGROUND

A lossless network is a current research focus of a data center network, a high-performance computer interconnection network, and a multi-core processor network-on-chip. For the high-performance computer interconnection network and the multi-core processor network-on-chip, a credit-based flow control mechanism is usually used to ensure that no packet loss occurs in the network. For the data center network, a priority-based flow control mechanism is usually used to ensure that no packet loss occurs in the network. However, in any scenario, network blocking occurs due to a characteristic of the lossless network.

SUMMARY

This application discloses a data processing method and apparatus, and a switching device, to alleviate network blocking in a lossless network.

According to a first aspect, this application provides a data processing method. The method includes the following steps: first, obtaining a destination address of a data packet received by an input port; second, determining a plurality of available output ports based on the destination address; then, determining a busy degree of each of the plurality of available output ports, when there is no non-busy available output port in the plurality of available output ports, determining a quantity of footprint queues on the available output port, and selecting an available output port with a largest quantity of footprint queues as a target output port from the plurality of available output ports, where it should be noted that a destination address of a data packet at a queue tail of the footprint queue is the same as the destination address of the received data packet; and finally, determining a busy degree of a queue on the target output port, and when there is a non-busy queue on the target output port, selecting the non-busy queue as a target output queue.

When there is no non-busy available output port in the available output port, the available output port with the largest quantity of footprint queues is selected as the target output port. In this way, it can be ensured that the data packet is forwarded through the available output port with the largest quantity of footprint queues, and it can be ensured that data packets that carry a same destination address are placed together on the same available output port. Even if a congestion occurs, a data packet on another available output port is not affected. In addition, because a congestion does not occur in the non-busy queue, using the non-busy queue as the target output queue can ensure that the data packet is not congested in the target output queue.

In an implementation of this application, the method further includes the following step: when there are a plurality of non-busy available output ports in the available output port, selecting a non-busy available output port from the plurality of non-busy available output ports as the target output port.

In this application, the non-busy available output port is selected as the target output port. In this way, it can be ensured that the data packet is preferably forwarded through the non-busy available output port.

In another implementation of this application, the selecting a non-busy available output port from the plurality of non-busy available output ports as the target output port includes: determining a quantity of footprint queues on each of the non-busy available output ports, and selecting a non-busy available output port with a largest quantity of footprint queues from the plurality of non-busy available output ports as the target output port.

To enable the data packet to move ahead along a non-busy queue or a footprint queue, quantities of footprint queues may be further compared. The available output port with the largest quantity of footprint queues is selected, so that the data packet has an opportunity to move ahead along the non-busy queue or the footprint queue. In this way, a probability of data packet blocking is effectively reduced.

In another implementation of this application, the selecting a non-busy available output port with a largest quantity of footprint queues as the target output port includes: determining a quantity of data packets or remaining bandwidth on the non-busy available output port with the largest quantity of footprint queues, and selecting a non-busy available output port with a smallest quantity of data packets or largest remaining bandwidth as the target output port.

When there are at least two available output port with a largest quantity of non-busy queues, and there further are at least two available output port with the largest quantity of footprint queues in at least two available output port with the largest quantity of non-busy queues, only one available output port needs to be used as the target output port, and when the data packet is sent on any one of the foregoing ports, it can be ensured that the data packet moves ahead along the non-busy queue or the footprint queue. Therefore, the target output port may be selected from the at least two available output port selected by comparing total quantities of data packets or remaining bandwidth. In this way, a probability of data packet blocking is further reduced.

In another implementation of this application, the method further includes the following step: when there is no non-busy queue on the target output port, selecting a footprint queue on the target output port as the target output queue.

When there is no non-busy queue on the target output port, the footprint queue on the target output port is selected as the target output queue. Even if a congestion occurs in the footprint queue, a data packet in another queue is not prevented from being sent. Therefore, a network resource is properly used, and network blocking in a lossless network is alleviated.

In another implementation of this application, the determining a busy degree of the available output port includes: determining a quantity of non-busy queues on each of the plurality of available output ports, obtaining a percentage of the quantity of non-busy queues in a total quantity of queues on each of the plurality of available output ports, determining that an available output port with a percentage which is greater than a first threshold is a non-busy available output port.

The first threshold is from 0 to 100%, and may be 50%. The busy degree of the available output port may be defined by setting the first threshold.

In another implementation of this application, the determining a busy degree of the available output port includes: determining a quantity of non-busy queues on each of the plurality of available output ports, and determining an available output port with a largest quantity of non-busy queues as a non-busy available output port.

In another implementation of this application, the determining a busy degree of a queue on the target output port includes: determining a cache space occupied by a data packet in the queue, and when a percentage of the cache space occupied by the data packet to a cache capacity of the queue is not greater than a second threshold, determining that the queue is a non-busy queue.

A queue may accommodate a plurality of data packets, and a quantity of data packets is a queue depth. The second threshold is set according to a requirement to define the queue depth, so that application flexibility can be increased. The second threshold may be 0, and in this case, a queue is a non-busy queue provided that there is a data packet in the queue. The data packet is preferably transmitted by using a queue in which there is no data packet. Therefore, a packet transmission speed is greatly increased and a probability of data packet blocking is reduced.

According to a second aspect, this application provides a data processing method. The method includes: obtaining a destination address of a data packet received by an input port; second, determining a plurality of available output ports based on the destination address; determining a busy degree of each of the plurality of available output ports, when there is no non-busy available output port in the plurality of available output ports, determining a quantity of footprint queues on each of the plurality of available output ports, and selecting an available output port with a largest quantity of footprint queues as a target output port from the plurality of available output ports, where a destination address of a data packet at a queue tail of the footprint queue is the same as the destination address of the received data packet; and determining a busy degree of a queue on the target output port, and when there is no non-busy queue on the target output port, selecting a footprint queue on the target output port as a target output queue.

When there is no non-busy available output port in the available output port, the available output port with the largest quantity of footprint queues is selected as the target output port. In this way, it can be ensured that the data packet is forwarded through the available output port with the largest quantity of footprint queues, and it can be ensured that data packets that carry a same destination address are placed together on the same available output port. Even if a congestion occurs, a data packet on another available output port is not affected. In addition, when there is no non-busy queue on the target output port, the footprint queue on the target output port is selected as the target output queue. Even if a congestion occurs in the footprint queue, a data packet in another queue is not prevented from being sent. Therefore, a network resource is properly used, and network blocking is alleviated in a lossless network.

In an implementation of this application, the method further includes: when there are a plurality of a non-busy available output ports in the plurality of available output ports, selecting a non-busy available output port from the plurality of non-busy available output ports as the target output port.

In this application, the non-busy available output port is selected as the target output port. In this way, it can be ensured that the data packet is preferably forwarded through the non-busy available output port.

In another implementation of this application, the selecting a non-busy available output port from the plurality of non-busy available output ports as the target output port includes: determining a quantity of footprint queues on each of the non-busy available output ports, and selecting a non-busy available output port with a largest quantity of footprint queues from the plurality of non-busy available output ports as the target output port.

To enable the data packet to move ahead along a non-busy queue or a footprint queue, quantities of footprint queues may be further compared. The available output port with the largest quantity of footprint queues is selected, so that the data packet has an opportunity to move ahead along the non-busy queue or the footprint queue. In this way, a probability of data packet blocking is effectively reduced.

In another implementation of this application, the selecting a non-busy available output port with a largest quantity of footprint queues as the target output port includes: determining a quantity of data packets or remaining bandwidth on each of the non-busy available output ports with the largest quantity of footprint queues, and selecting a non-busy available output port with a smallest quantity of data packets or largest remaining bandwidth from the non-busy available output ports with the largest quantity of footprint queues as the target output port.

When there are at least two available output port with a largest quantity of non-busy queues, and there further are at least two available output port with the largest quantity of footprint queues in at least two available output port with the largest quantity of non-busy queues, only one available output port needs to be used as the target output port, and when the data packet is sent on any one of the foregoing ports, it can be ensured that the data packet moves ahead along the non-busy queue or the footprint queue. Therefore, the target output port may be selected from the at least two available output port selected by comparing total quantities of data packets or remaining bandwidth. In this way, a probability of data packet blocking is further reduced.

In another implementation of this application, the determining a busy degree of each of the plurality of available output ports includes: determining a quantity of non-busy queues on each of the plurality of available output ports, obtaining a percentage of the quantity of non-busy queues in a total quantity of queues on each of the plurality of available output ports, determining that an available output port with a percentage which is greater than a first threshold is a non-busy available output port.

The first threshold is from 0 to 100%, and may be 50%. The busy degree of the available output port may be defined by setting the first threshold.

In another implementation of this application, the determining a busy degree of each of the plurality of available output ports includes: determining a quantity of non-busy queues on each of the plurality of available output ports, and determining an available output port with a largest quantity of non-busy queues as a non-busy available output port.

In another implementation of this application, the determining a busy degree of a queue on the target output port includes: determining a cache space occupied by a data packet in the queue, and when a percentage of the cache space occupied by the data packet to a cache capacity of the queue is not greater than a second threshold, determining that the queue is a non-busy queue.

A queue may accommodate a plurality of data packets, and a quantity of data packets is a queue depth. The second threshold is set according to a requirement to define the queue depth, so that application flexibility can be increased. The second threshold may be 0, and in this case, a queue is a non-busy queue provided that there is a data packet in the queue. The data packet is preferably transmitted by using a queue in which there is no data packet. Therefore, a packet transmission speed is greatly increased and a probability of data packet blocking is reduced.

According to a third aspect, this application provides a data processing apparatus. The apparatus includes: a destination address obtaining module, configured to obtain a destination address of a data packet received by an input port; an available output port determining module, configured to determine a plurality of available output ports based on the destination address; a target output port selection module, configured to: determine a busy degree of each of the plurality of available output ports, when there is no non-busy available output port in the plurality of available output ports, determine a quantity of footprint queues on the available output port, and select an available output port with a largest quantity of footprint queues as the target output port from the plurality of available output ports, where a destination address of a data packet at a queue tail of the footprint queue is the same as the destination address of the received data packet; and a target output queue selection module, configured to: determine a busy degree of a queue on the target output port, and when there is a non-busy queue on the target output port, select the non-busy queue as a target output queue.

Any one of the third aspect or the implementations of the third aspect is an apparatus implementation corresponding to any one of the first aspect or the implementations of the first aspect. A description in any one of the first aspect or the implementations of the first aspect is applicable to any one of the third aspect or the implementations of the third aspect. Details are not described herein again.

According to a fourth aspect, an embodiment of the present disclosure provides a data processing apparatus. The apparatus includes: a destination address obtaining module, configured to obtain a destination address of a data packet received by an input port; an available output port determining module, configured to determine a plurality of available output ports based on the destination address; a target output port selection module, configured to: determine a busy degree of each of the plurality of available output ports, when there is no non-busy available output port in the plurality of available output ports, determine a quantity of footprint queues on each of the plurality of available output ports, and select an available output port with a largest quantity of footprint queues from the plurality of available output ports as the target output port, where a destination address of a data packet at a queue tail of the footprint queue is the same as the destination address of the received data packet; and a target output queue selection module, configured to: determine a busy degree of a queue on the target output port, and when there is no non-busy queue on the target output port, select a footprint queue on the target output port as a target output queue.

Any one of the fourth aspect or the implementations of the fourth aspect is an apparatus implementation corresponding to any one of the second aspect or the implementations of the second aspect. A description in any one of the second aspect or the implementations of the second aspect is applicable to any one of the fourth aspect or the implementations of the fourth aspect. Details are not described herein again.

According to a fifth aspect, this application provides a switching device. The switching device has a function of implementing the switching device in the foregoing method embodiments. The function may be implemented by hardware, or may be implemented by hardware by executing corresponding software. The hardware or the software includes one or more modules corresponding to the foregoing function. Optionally, the switching device may be a network side device, such as a switch or a physical server that implements a switch function.

DESCRIPTION OF EMBODIMENTS

The technical solutions according to embodiments of the present disclosure are clearly and completely described in the following with reference to the accompanying drawings. Apparently, the described embodiments are merely some but not all of the embodiments of the present disclosure.

Figure 1:
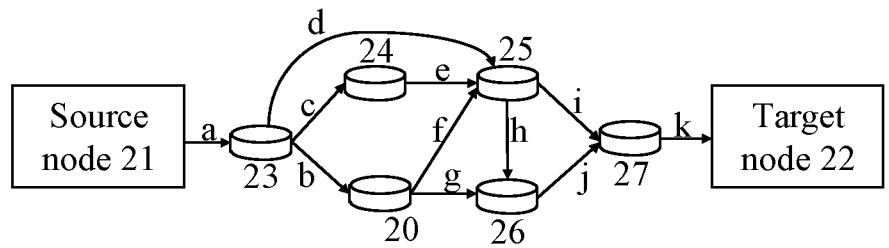
FIG. 1 is a schematic topology diagram of a network system according to an embodiment of the present disclosure.

First, FIG. 1 is a schematic topology diagram of a network system according to an embodiment of the present disclosure. As shown in FIG. 1, the network system includes a source node 21, a destination node 22, and a plurality of switching devices 20, 23, 24, 25, 26, and 27.

The source node 21 is connected to the switching device 23. The destination node 22 is connected to the switching device 27. The source node 21 sends a data packet to the switching device 23. The data packet carries a destination address, and the destination address is a network address of the destination node 22. As shown in FIG. 1, after the data packet arrives at the switching device 23, the switching device 23 calculates routes based on the destination address carried in the data packet, to learn that next-hop switching devices may be the switching device 20, the switching device 24, and the switching device 25 respectively.

If the switching device 23 selects the switching device 20 as a next hop, the switching device 20 receives the data packet sent by the switching device 23, and calculates routes based on the destination address carried in the data packet, to learn that next-hop switching devices may be the switching device 25 and the switching device 26 respectively. If the switching device 20 selects the switching device 26 as a next hop, after receiving the data packet, the switching device 26 may learn, by calculating a route, that a next-hop switching device is the switching device 27. Because there is only one next-hop switching device that is the switching device 27, the switching device 26 sends the data packet to the switching device 27, and the switching device 27 sends the data packet to the destination node 22.

In the foregoing example, the data packet arrives at the destination node 22 through a path a-b-g-j-k. Similarly, the data packet may alternatively arrive at the destination node 22 through a path a-b-f-i-k, a path a-c-e-h-j-k, a path a-d-i-k, or another path. It may be learned that, when it is ensured, by calculating a route, that the data packet sent by the source node 21 arrives the destination node 22, the data packet may be sent to the destination node 22 through a plurality of different paths. For a switching device having a plurality of output ports, after a route is calculated based on the destination address of the data packet, an available output port may be selected from the plurality of output ports. After being output from the available output port, the data packet may be routed to the destination address of the data packet. When there are a plurality of available output ports, an available output port is selected based on network statuses of networks connected to different available output ports. Congestion may occur on an available output port, and the data packet may be congested when being sent through the available output port on which congestion occurs.

According to a switching device provided in this embodiment of the present disclosure, a relatively idle available output port may be selected to send a data packet, to prevent the data packet from being congested.

Figure 2:
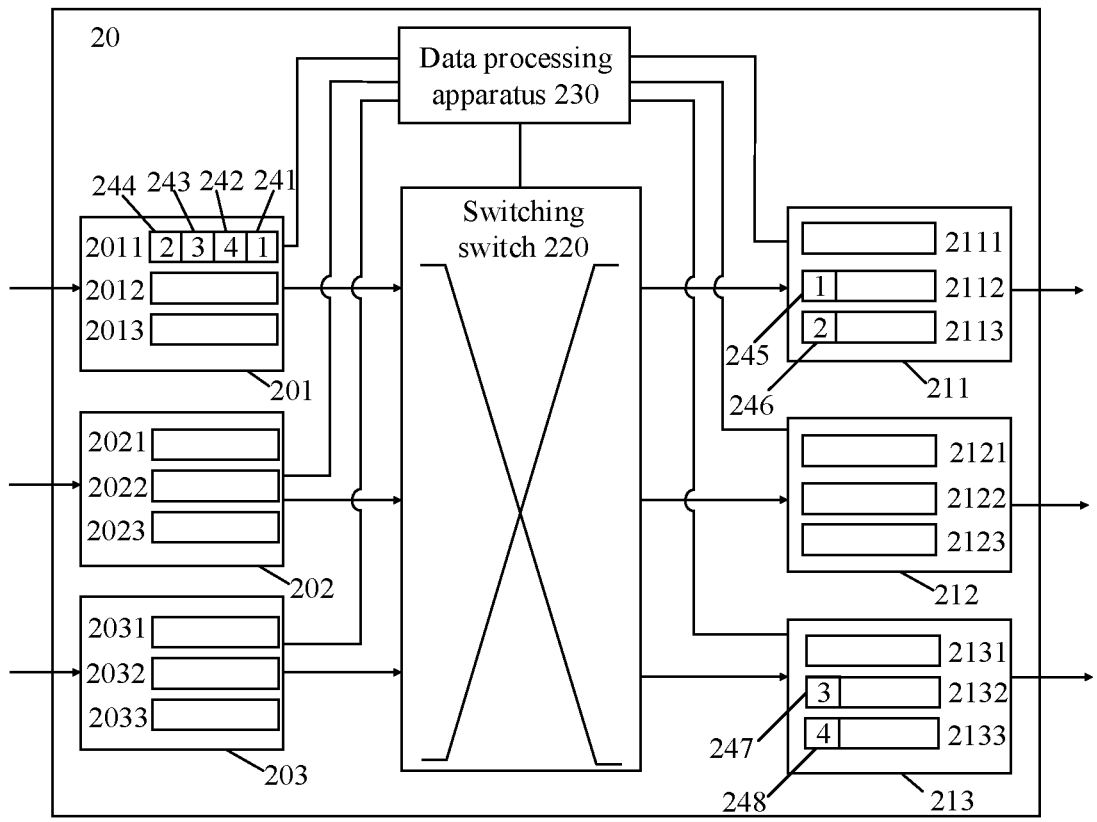
FIG. 2 is a schematic diagram of an apparatus structure of a switching device according to an embodiment of the present disclosure.

With reference to FIG. 2, the following describes a structure of the switching device 20 by using an example. FIG. 2 is a schematic diagram of an apparatus structure of the switching device according to this embodiment of the present disclosure. As shown in FIG. 2, the switching device 20 includes a plurality of input ports 201, 202, and 203, a plurality of output ports 211, 212, and 213, a switching device 220, and a data processing apparatus 230.

The data processing apparatus 230 is separately connected to each input port, each output port, and the switching device 220. Each of the input ports 201, 202, and 203 is connected to the switching device 220. Each of the output ports 211, 212, and 213 is connected to the switching device 220. A plurality of queues are set on each input port and each output port. Queues 2011, 2012, and 2013 are set on the input port 201, queues 2021, 2022, and 2023 are set on the input port 202, queues 2031, 2032, and 2033 are set on the input port 203, queues 2111, 2112 and 2113 are set on the output port 211, queues 2121, 2122, and 2123 are set on the output port 212, and queues 2131, 2132, and 2133 are set on the output port 213.

It should be noted that, in some examples, a quantity of input ports and output ports are not limited to that shown in FIG. 2, and may be arbitrarily set based on a requirement. This is not limited in this embodiment of the present disclosure. However, two or more queues need to be set on an output port.

In addition, in an optional embodiment, only one queue instead of two or more queues needs to be set.

In addition, in this embodiment, port numbers are set for each input port and each output port, queue numbers are set for the queue on each input port and the queue on each output port, and the data processing apparatus 230 records the numbers.

Further, a cache is correspondingly set in each queue on the input port and the output port, and the caches are set in a first in first out (FIFO) queue. The data processing apparatus 230 accesses data packets at queue heads of all the queues in any manner (for example, at a same time, by polling, in a priority order, by dividing the input ports into several groups and polling each group, or based on a priority), obtains destination addresses of the data packets, and calculates routes based on the destination addresses, to obtain numbers of available output ports.

In this example, a port number of the output port 211 is 1, a port number of the output port 212 is 2, and a port number of the output port 213 is 3. In addition, a queue number of the queue 2111 on the output port 211 is 1, a queue number of the queue 2112 on the output port 211 is 2, and a queue number of the queue 2113 on the output port 211 is 3; a queue number of the queue 2121 on the output port 212 is 1, a queue number of the queue 2122 on the output port 212 is 2, and a queue number of the queue 2123 on the output port 212 is 3; a queue number of the queue 2131 on the output port 213 is 1, a queue number of the queue 2132 on the output port 213 is 2, and a queue number of the queue 2133 on the output port 213 is 3.

In addition, as shown in FIG. 2, there are data packets 241, 242, 243, and 244 in the queue 2011 on the input port 201, and there is no data packet in the other queues on the input port 201, all the queues on the input port 202, and all the queues on the input port 203; and there is a data packet 245 in the queue 2112 on the output port 211, there is a data packet 246 in the queue 2113 on the output port 211, there is a data packet 247 in the queue 2132 on the output port 213, there is a data packet 248 in the queue 2133 on the output port 213, and there is no data packet in the queue 2111 on the output port 211, all the queues on the output port 212, and the queue 2131 on the output port 213.

It should be noted that a data packet may be located at a queue head or a queue tail of a queue, or at middle between the queue head and the queue tail of the queue. For example, in the queue 2011, the data packet 241 is located at a queue head, the data packet 244 is located at a queue tail, and the data packets 242 and 243 are located at middle of the queue. The queue is a first in first out queue, the data packet located at the queue head is the first data packet to enter the queue, and the data packet located at the queue tail is the last data packet to enter the queue. The data packet located at the queue head is preferably processed, and the data packet located at the queue tail may gradually shift to the queue head.

In addition, in this embodiment of the present disclosure, when the data processing apparatus 230 determines that a percentage of cache space occupied by a data packet in one queue on an output port to a cache capacity of the queue is not greater than a second threshold, the data processing apparatus 230 defines the queue as a non-busy queue. A value of the second threshold ranges from 0 to 100%, for example, 50%. For ease of description, in this embodiment, the second threshold is set to 0. In other words, a queue may be determined as a non-busy queue provided that there is no data packet in the queue (in other words, the queue is idle).

Further, in this embodiment of the present disclosure, when the data processing apparatus 230 determines that a destination address of a data packet located at a queue tail of a queue on an output port is the same as the destination address of the received data packet, the data processing apparatus 230 defines the queue as a footprint queue. Because data packets destined for a same destination address are sent together to a footprint queue, a data packet destined for another destination address is not affected when a congestion occurs in the footprint queue.

Further, a destination address carried in the data packet 241 is a destination address 1, a destination address carried in the data packet 242 is a destination address 4, a destination address carried in the data packet 244 is a destination address 3, a destination address carried in the data packet 244 is a destination address 2, a destination address carried in the data packet 245 is the destination address 1, a destination address carried in the data packet 246 is the destination address 2, a destination address carried in the data packet 247 is the destination address 3, and a destination address carried in the data packet 248 is the destination address 4.

Optionally, the destination address may be an IP address or a media access control (MAC) address.

Figure 3:
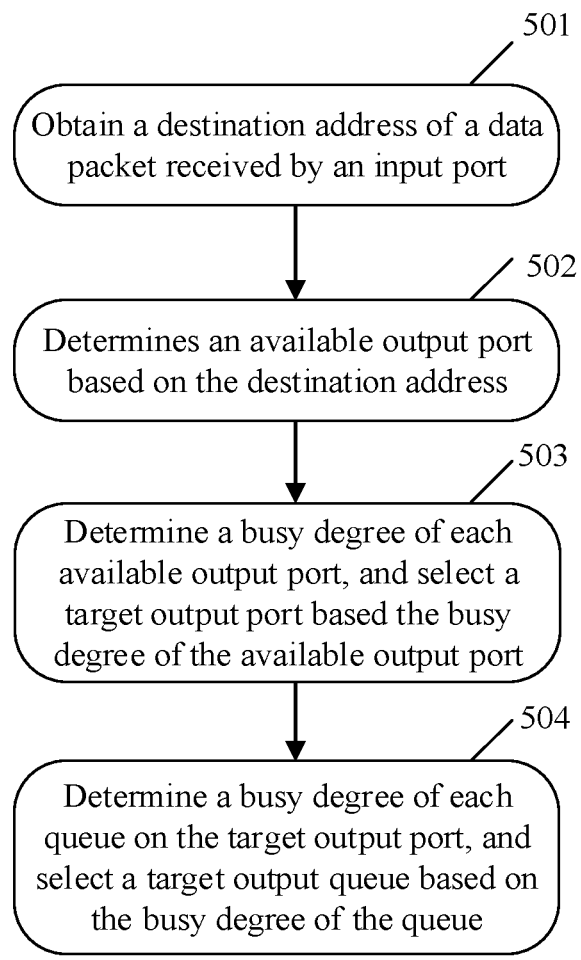
FIG. 3 is a flowchart of a data processing method according to an embodiment of the present disclosure.

First, FIG. 3 is a flowchart of a data processing method according to an embodiment of the present disclosure. As shown in FIG. 3, the data processing method includes the following steps.

Step 501: A data processing apparatus 230 obtains a destination address of a data packet received by an input port 201.

The data processing apparatus 230 obtains a destination address 1 of a data packet 242 at a queue tail of a queue 2011 on the input port 201.

Step 502: The data processing apparatus 230 determines an available output port based on the destination address.

The data processing apparatus 230 determines available output ports 211 and 213 based on the destination address.

Step 503: The data processing apparatus 230 determines a busy degree of each available output port, and when there is a non-busy available output port in the available output ports, selects the non-busy available output port as a target output port, or when there is no non-busy available output port in the available output ports, determines a quantity of footprint queues on each available output port, and selects an available output port with a largest quantity of footprint queues as a target output port.

In this step, the data processing apparatus 230 may determine cache space of a data packet in each queue, and when a percentage of the cache space occupied by the data packet to a cache capacity of the queue is not greater than a second threshold, determine that the current queue is a non-busy queue.

In this step, the data processing apparatus 230 may determine a quantity of non-busy queues on each available output port, obtain a percentage of the quantity of non-busy queues on each available output port in a total quantity of queues on each available output port, and when the percentage is greater than a first threshold, determine a current available output port as a non-busy available output port, or when the percentage is less than or equal to a first threshold, determine a current available output port as a busy available output port. A value of the first threshold ranges from 0 to 100%, and the first threshold may be 50%.

On the available output port 211, a percentage of a quantity of non-busy queues being 1 in a total quantity of queues being 3 on the available output port 211 is less than 50%. In this case, it is determined that the available output port 211 is not busy.

Likewise, the available output port 211 is not busy, and in this case, a quantity of footprint queues on the available output port 211 is further compared with a quantity of footprint queues on the available output port 213. The quantity of footprint queues on the available output port 211 is 1, and the quantity of footprint queues on the available output port 213 is 0. Therefore, the available output port 211 with a largest quantity of footprint queues is selected as the target output port.

In an optional embodiment, an available output port with a largest quantity of non-busy queues may be directly determined as a non-busy available output port.

In some examples, when there are at least two non-busy available output ports, the data processing apparatus 230 determines quantities of footprint queues on the non-busy available output ports, and selects a non-busy available output port with a largest quantity of footprint queues as the target output port.

In some examples, when there are at least two non-busy available output ports, and the at least two non-busy available output ports include at least two non-busy available output ports with a largest quantity of footprint queues, the data processing apparatus 230 determines quantities of data packets or remaining bandwidth on the non-busy available output ports with the largest quantity of footprint queues, and selects a non-busy available output port with a smallest quantity of data packets or largest remaining bandwidth as the target output port.

Step 504: The data processing apparatus 230 determines a busy degree of each queue on the target output port 211, and when there is a non-busy queue on the target output port 211, selects the non-busy queue as a target output queue, or when there is no non-busy queue on the target output port 211, selects a footprint queue on the target output port as a target output queue, where a destination address of a data packet at a queue tail of the footprint queue is the same as the destination address of the received data packet.

Because there is a non-busy queue 2111 on the target output port 211, the non-busy queue 211 is selected as the target output queue.

In this application, the non-busy available output port is selected as the target output port. In this way, it can be ensured that a data packet is forwarded through the non-busy available output port. In addition, when there is no non-busy queue on the target output port, the footprint queue on the target output port is selected as the target output queue. Even if a congestion occurs in the footprint queue, a data packet in another queue is not prevented from being sent. Therefore, a network resource is properly used, and network blocking can be effectively alleviated. When there is no non-busy available output port in the available output ports, the available output port with the largest quantity of footprint queues is selected as the target output port. In this way, it can be ensured that the data packet is forwarded through the available output port with the largest quantity of footprint queues, and it can be ensured that data packets that carry a same destination address are placed together on the same available output port. Even if a congestion occurs, a data packet on another available output port is not affected. Because a congestion does not occur in the non-busy queue, using the non-busy queue as the target output queue can ensure that the data packet is not congested in the target output queue.

Figure 4:
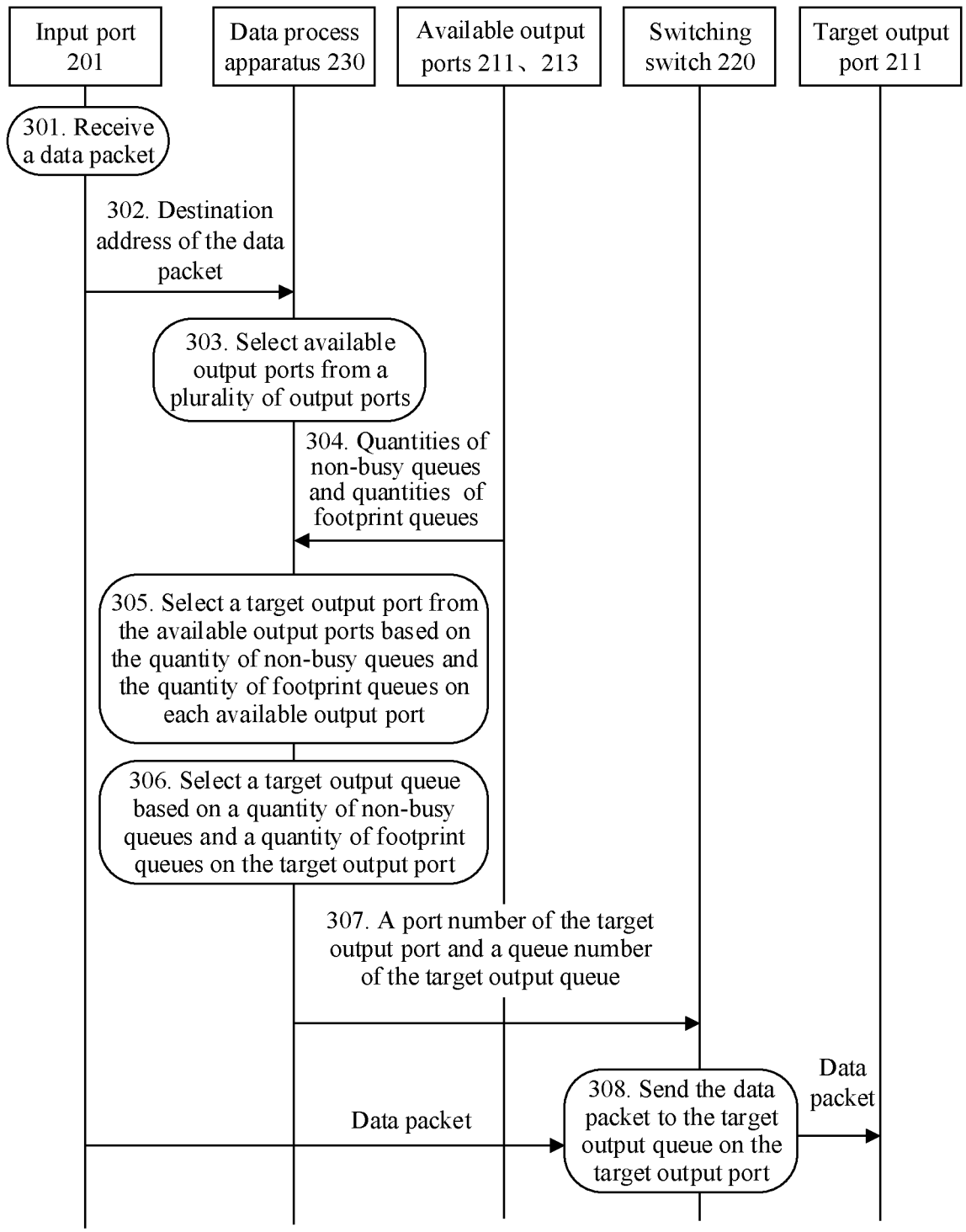
FIG. 4 is a data interaction diagram of a data processing method according to an embodiment of the present disclosure.

First, FIG. 4 is a data interaction diagram of a data processing method according to an embodiment of the present disclosure. As shown in FIG. 4, the data processing method includes the following steps.

Step 301: An input port 201 sequentially receives data packets 241, 242, 243, and 244.

The input port 201 places the data packets 241, 242, 243, and 244 in a queue 2011 in a first in first out manner.

Step 302: A data processing apparatus 230 obtains a destination address 1 of the data packet 241 from the queue 2011 on the input port 201.

The data processing apparatus 230 analyzes a header of the data packet 241, to obtain the destination address 1 from the header.

Step 303: The data processing apparatus 230 selects available output ports 211 and 213 from a plurality of output ports 211, 212, and 213 based on the destination address 1, where the data packet 241 may be routed to the destination address 1 through either the available output port 211 or the available output port 213.

Optionally, the data processing apparatus 230 may obtain the available output ports 211 and 213 according to a shortest path algorithm.

In addition, after obtaining the available output ports 211 and 213, the data processing apparatus 230 records a port number 1 of the available output port 211, and records a port number 3 of the available output port 213.

In some examples, a standard for determining the available output port may be one or a combination of the following:

a. whether a deadlock is generated when an output port is selected to send a data packet; and if the deadlock is generated, the output port is a non-available output port; or if the deadlock is not generated, the output port is an available output port;

b. whether a live-lock is generated when the output port is selected to send the data packet; and if the live-lock is generated, the output port is a non-available output port; or if the live-lock is not generated, the output port is an available output port; and c. whether an agreement is violated when the output port is selected to send the data packet; and if the agreement is violated, the output port is a non-available output port; or if the agreement is not violated, the output port is an available output port. The "agreement" may be set by an administrator; for example, the agreement may be that all data packets destined for a node 1 are not allowed to pass through the output port 212.

The deadlock means that a plurality of data packets depend on and block each other to form a ring, and consequently, all data packets in the ring cannot move ahead and can never reach a destination node. The live-lock is a state in which a data packet is not congested and can continue to move, but can never move to a destination node; for example, after moving one step forward, the data packet moves one step backward.

Step 304: The data processing apparatus 230 obtains quantities of non-busy queues and quantities of footprint queues on the available output ports 211 and 213.

In this step, the data processing apparatus 230 determines a status of each queue on the available output ports 211 and 213, and determines that there are one non-busy queue 2111 and one footprint queue 2113 on the available output port 211, and that there is one non-busy queue 2131 and no footprint queue on the available output port 213.

Step 305: The data processing apparatus 230 selects a target output port from the available output ports based on the quantity of non-busy queues and the quantity of footprint queues on each available output port.

In this step, when there are only at least two available output ports, the data processing apparatus 230 preferably selects an available output port with a largest quantity of non-busy queues; however, when there is no non-busy queue on each available output port, the data processing apparatus 230 selects an available output port with a largest quantity of footprint queues as the target output port.

In other examples, when there is only one available output port, the data processing apparatus 230 directly uses the available output port as the target output port.

Figure 5:
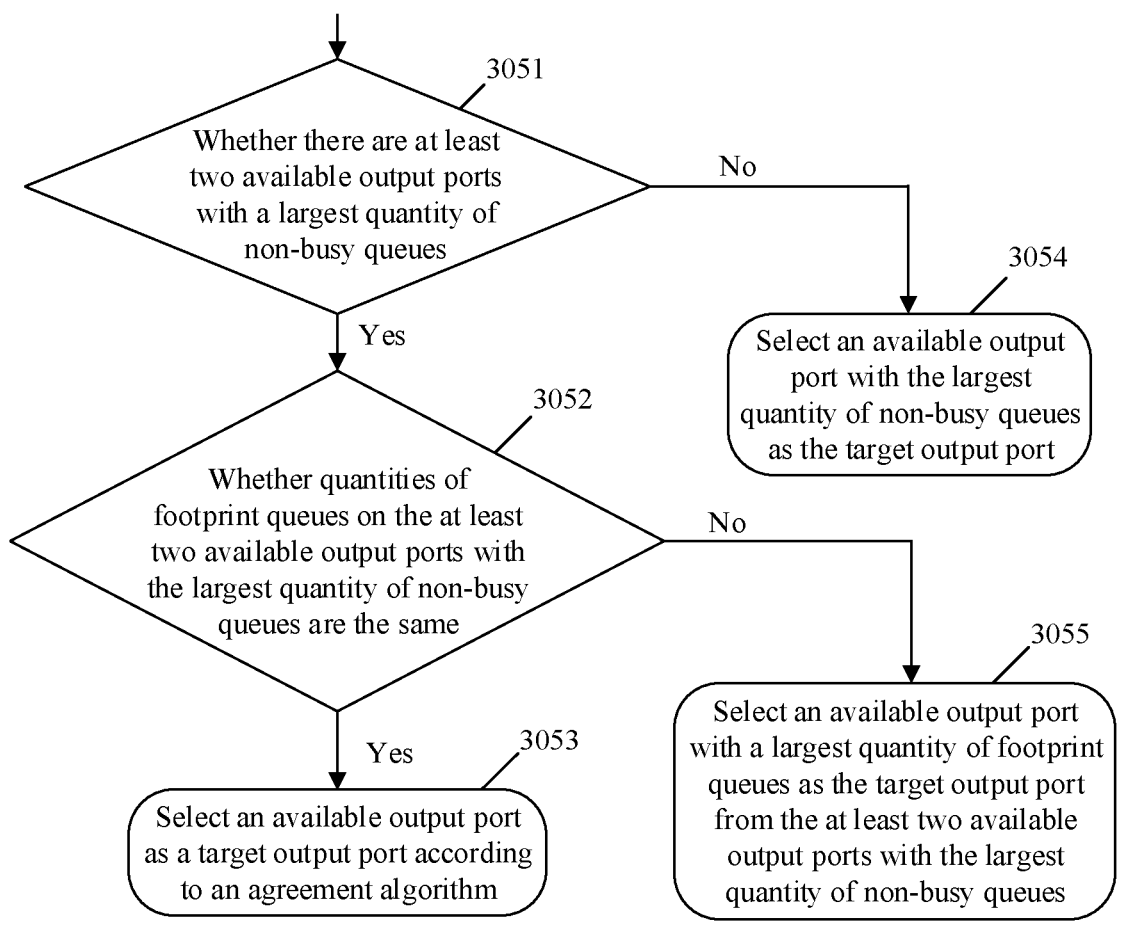
FIG. 5 is a sub-flowchart of a data processing method according to an embodiment of the present disclosure.

A scenario in which there are at least two available output ports is further described with reference to FIG. 5. FIG. 5 is a sub-flowchart of the data processing method according to this embodiment of the present disclosure. Step 305 in FIG. 5 includes the following sub-steps.

Step 3051: The data processing apparatus 230 determines whether there are at least two available output ports with a largest quantity of non-busy queues; and if there are at least two available output ports with the largest quantity of non-busy queues, step 3052 is performed; or if there are less than two available output ports with the largest quantity of non-busy queues, step 3054 is performed.

Step 3052: The data processing apparatus 230 determines whether quantities of footprint queues on the at least two available output ports with the largest quantity of non-busy queues are the same; and if the quantities of footprint queues on the at least two available output ports with the largest quantity of non-busy queues are the same, step 3053 is performed; or if the quantities of footprint queues on the at least two available output ports with the largest quantity of non-busy queues are not the same, step 3055 is performed.

Optionally, in this step, the data processing apparatus 230 may determine whether quantities of footprint queues on all the available output ports are the same; and if the quantities of footprint queues on all the available output ports are the same, step 3053 is performed; or if the quantities of footprint queues on all the available output ports are not the same, step 3055 is performed.

Step 3054: The data processing apparatus 230 selects an available output port with the largest quantity of non-busy queues as the target output port.

Step 3053: The data processing apparatus 230 selects an available output port as the target output port according to an agreement algorithm.

The agreement algorithm in this step includes but is not limited to:

1. Random selection.
2. Performing an operation on a destination address of a data packet according to a hash algorithm, and selecting the target output port based on an operation value, for example, selecting the target output port based on parity of the operation value.

3. Selecting an available output port with a smallest quantity of data packets from the plurality of output ports.

4. Selecting an available output port with largest remaining bandwidth.

In this embodiment of the present disclosure, the data processing apparatus 230 determines that there are the at least two available output ports with the largest quantity of non-busy queues, and that the quantities of footprint queues on the at least two available output ports with the largest quantity of non-busy queues are the same. In this case, because both the quantities of the non-busy queues and the quantities of footprint queues on these available output ports are the same, any available output port is an optimal choice.

Step 3055: The data processing apparatus 230 selects an available output port with a largest quantity of footprint queues as a target output port from the at least two available output ports with the largest quantity of non-busy queues.

Based on the foregoing procedure, in the embodiment shown in FIG. 2, because there is the one non-busy queue 2111 on the available output port 211, and there is the one non-busy queue 2131 on the available output port 213, the data processing apparatus 230 determines that there are the two available output ports 211 and 213 with the largest quantity of non-busy queues. Further, because there is the one footprint queue 2113 on the available output port 211, and there is no footprint queue on the available output port 213, the data processing apparatus 230 determines that the quantity of footprint queues on the available output port 211 is different from the quantity of footprint queues on the available output port 213. In this case, the data processing apparatus 230 selects the available output port 211 with the largest quantity of footprint queues as the target output port, and records the port number 1 of the available output port 211.

Step 306: The data processing apparatus 230 selects a target output queue based on a quantity of non-busy queues and a quantity of footprint queues on the target output port.

Figure 6:
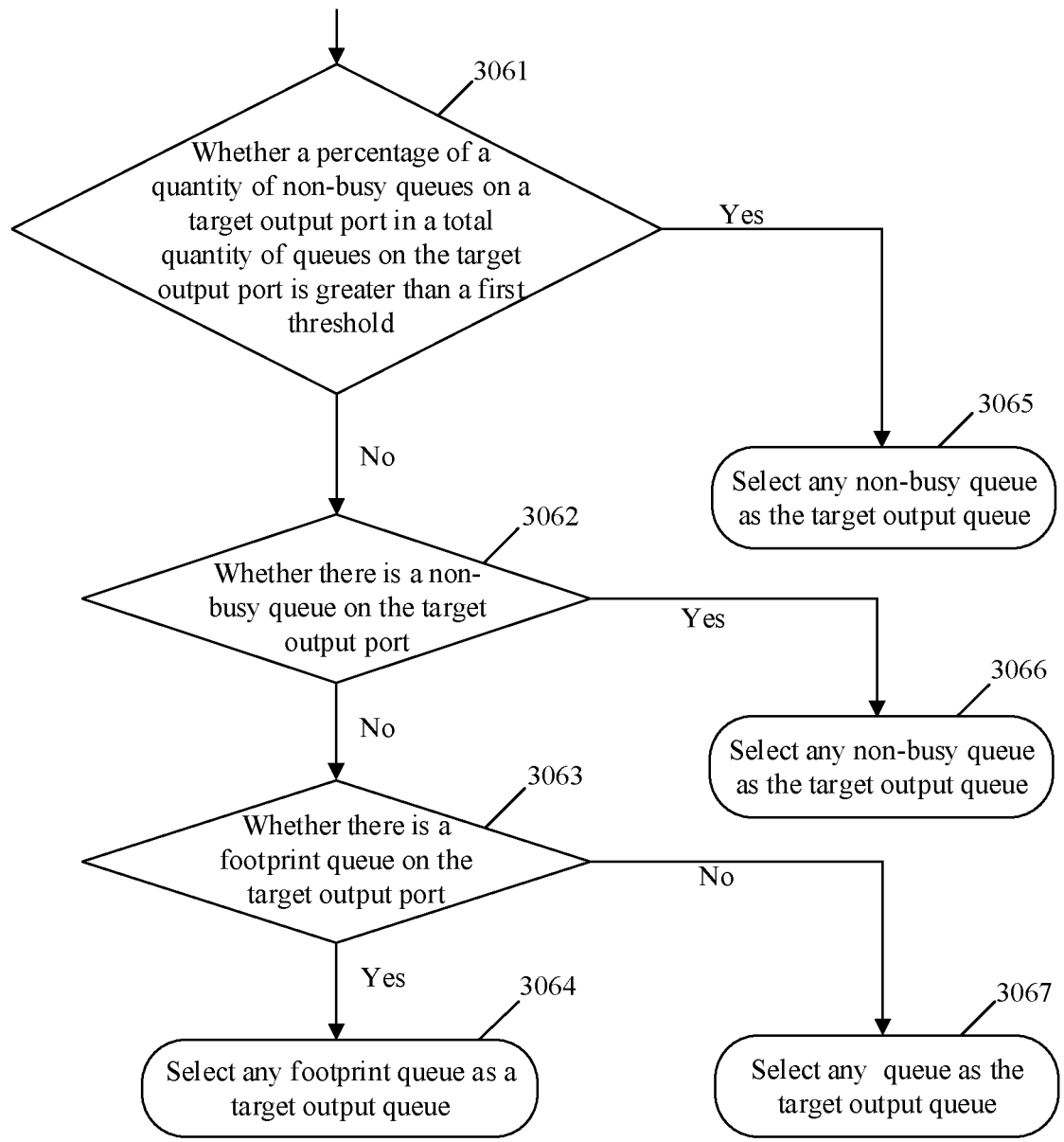
FIG. 6 is another sub-flowchart of a data processing method according to an embodiment of the present disclosure.

For ease of description, FIG. 6 is another sub-flowchart of the data processing method according to this embodiment of the present disclosure. As shown in FIG. 6, step 306 in FIG. 4 includes the following sub-steps.

Step 3061: The data processing apparatus 230 determines whether a percentage of the quantity of non-busy queues on the target output port in a total quantity of queues on the target output port is greater than a first threshold; and if the percentage is greater than the first threshold, step 3065 is performed; or if the percentage is less than or equal to the first threshold, step 3062 is performed.

The first threshold is used to indicate a congestion degree of the target output port, and a value of the first threshold ranges from 0 to 100%00%. Optionally, in this embodiment, the first threshold is set to 50%. When the percentage of the quantity of non-busy queues on the target output port in the total quantity of queues on the target output port is greater than the first threshold, it is determined that congestion does not occur on the target output port. When the percentage of the quantity of non-busy queues on the target output port in the total quantity of queues on the target output port is less than or equal to the first threshold, it is determined that congestion occurs on the target output port.

Step 3062: The data processing apparatus 230 determines whether there is a non-busy queue on the target output port; and if there is the non-busy queue on the target output port, step 3066 is performed; or if there is no non-busy queue on the target output port, step 3063 is performed.

Step 3062: The data processing apparatus 230 determines whether there is a footprint queue on the target output port; and if there is the footprint queue on the target output port, step 3064 is performed; or if there is no footprint queue on the target output port, step 3067 is performed.

Step 3064: The data processing apparatus 230 selects any footprint queue as the target output queue.

Step 3065: The data processing apparatus 230 selects any non-busy queue as the target output queue.

Step 3066: The data processing apparatus 230 selects any non-busy queue as the target output queue.

Step 3067: The data processing apparatus 230 selects any queue as the target output queue.

Based on the foregoing procedure, in the embodiment shown in FIG. 2, on the target output port 211, the total quantity of queues is 3, and the quantity of non-busy queues is 1. In this case, in step 3061, the data processing apparatus 230 determines that ⅓ is less than 50%, and determines that congestion occurs on the target output port 211, and further, step 3062 is performed. In step 3062, because there is the one non-busy queue 2111 on the available output port 211, the data processing apparatus 230 determines that there is the non-busy queue 2111 on the target output port 211, and further, step 3066 is performed. In step 3066, the data processing apparatus 230 selects the non-busy queue 2111 as the target output queue, and records a queue number 1 of the target output queue 211 on the first output port 211.

Step 307: The data processing apparatus 230 sends the port number 1 of the target output port 211 and the queue number 1 of the target output queue 2111 to a switching device 220.

Step 308: The switching device 220 sends the data packet 242 in the queue 2011 on the input port 201 to the target output queue 2111 on the target output port 211 based on the port number 1 and the queue number 1.

The switching device 220 sends the data packet 242 to a queue tail of the target output queue 2111.

Figure 7:
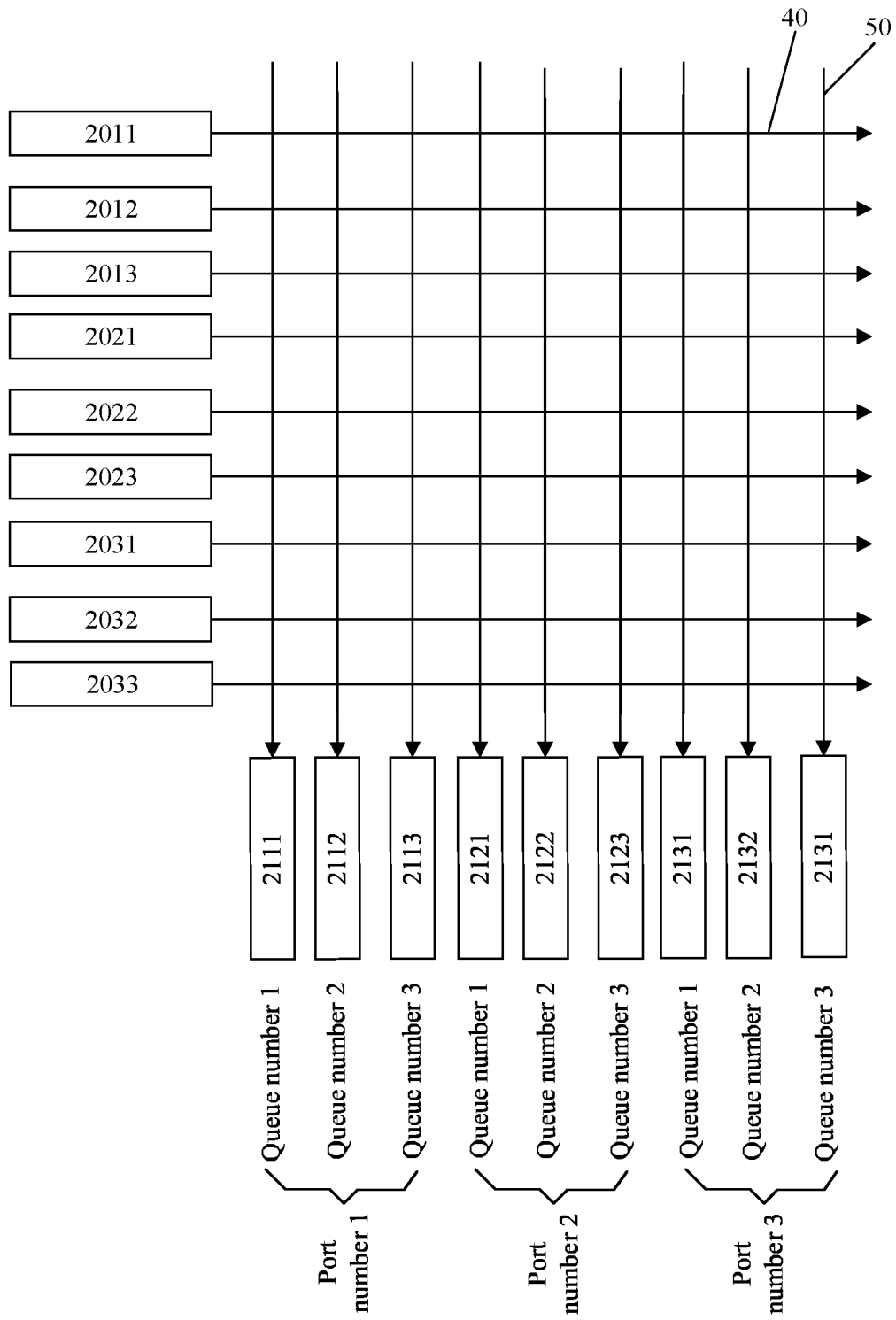
FIG. 7 is a schematic diagram of an apparatus structure of a switching device according to an embodiment of the present disclosure.

For further clarity of description, reference may be made to FIG. 7. FIG. 7 is a schematic diagram of an apparatus structure of a switching device 220 according to an embodiment of the present disclosure. As shown in FIG. 7, the switching device 220 includes a plurality of input data lines 40 and a plurality of output data lines 50 that can be selectively connected. Each input data line is connected to a queue of an input port, and is configured to receive a data packet at a queue head of the queue, and each output data line is connected to a queue of an output port.

Figure 8:
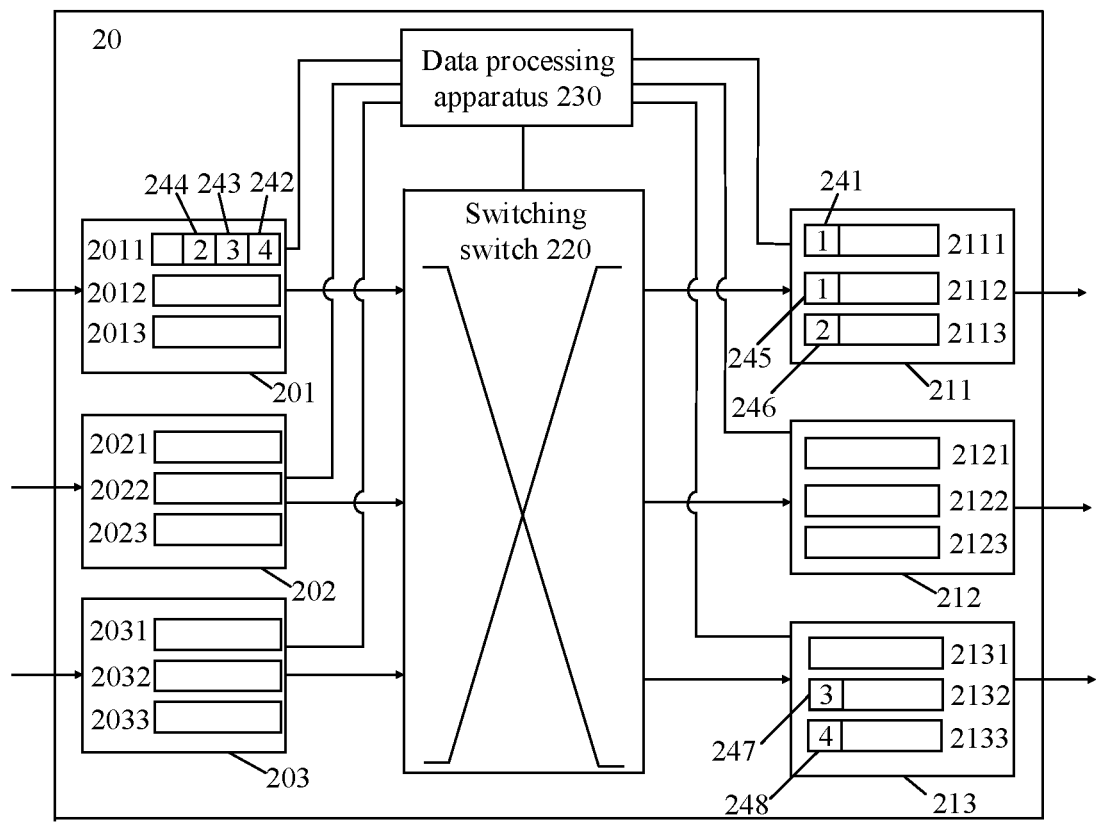
FIG. 8 is another schematic diagram of an apparatus structure of a switching device according to an embodiment of the present disclosure.

In this embodiment of the present disclosure, a data processing apparatus 230 obtains a destination address 1 from a data packet 241 in a queue 2011, and simultaneously, sends a notification to the switching device 220, to notify the switching device 220 that the data packet 241 in the queue 2011 is to be sent. In this case, the switching device 220 selects an input data line connected to the queue 2011. After obtaining a port number 1 of a target output port and a queue number 1 of a target output queue, the data processing apparatus 230 sends the port number 1 and the queue number 1 to the switching device 220. The switching device 220 selects, based on the port number 1 and the queue number 1, an output data line connected to the target output queue 2111, and connects the input data line that is previously selected and that is connected to the queue 2011 to the output data line connected to the target output queue 2111, and sends the data packet 241 at a queue head of the queue 2011 to a queue tail of the target output queue 2111. FIG. 8 is another schematic diagram of an apparatus structure of a switching device according to an embodiment of the present disclosure. FIG. 8 shows that the data packet 241 is input to the queue tail of the target output queue 2111.

In this embodiment of the present disclosure, a queue on an output port is numbered in a manner of local numbering. Therefore, the data processing apparatus 230 needs to send a number of the output port and a number of a target output queue on the output port to the switching device 220, to select an output data line. In other examples, a queue on the output port may be numbered in a manner of global numbering. In this case, the data processing apparatus 230 only needs to send a global number of a target output queue to the switching device 220, and the switching device 220 may select an output data line based on the global number. The global number may be used to distinguish between queues of all output ports.

It should be noted that the data processing apparatus 230 and the switching device 220 may perform similar processing on each of the other data packets 242, 243, and 244 in the queue 2011 on an input port 201, and may perform similar processing on a data packet in a queue on another output port, so that the data packet on the input port is preferably sent to a queue on a relatively idle output port. Therefore, network blocking is effectively alleviated. Further, in this embodiment of the present disclosure, quantities of queues on an output port and an input port are independent of a quantity of target nodes, and may be arbitrarily set according to a requirement. Therefore, this embodiment of the present disclosure is applicable to a network system of any size.

Therefore, in this embodiment of the present disclosure, a network idle resource is properly used, so that network blocking can be effectively alleviated in a large-scale network system.

Figure 9:
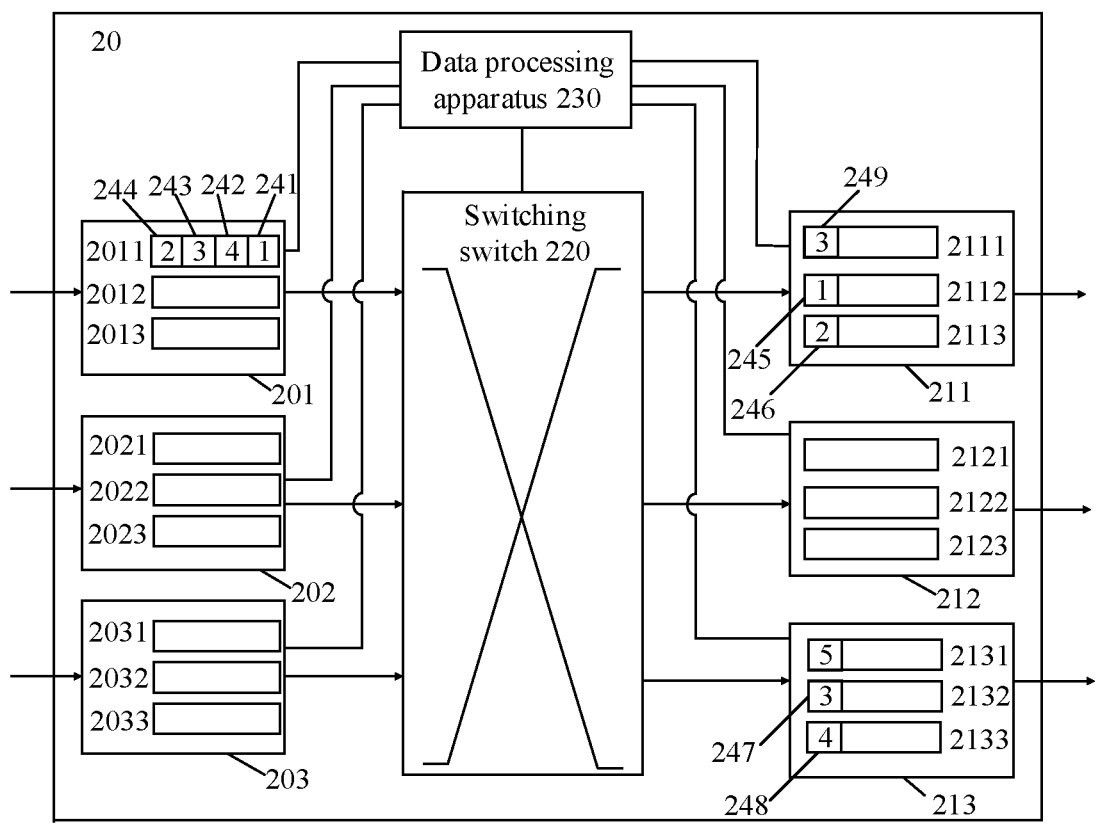
FIG. 9 is a schematic diagram of an apparatus structure of a switching device before forwarding a data packet according to an embodiment of the present disclosure.
Figure 10:
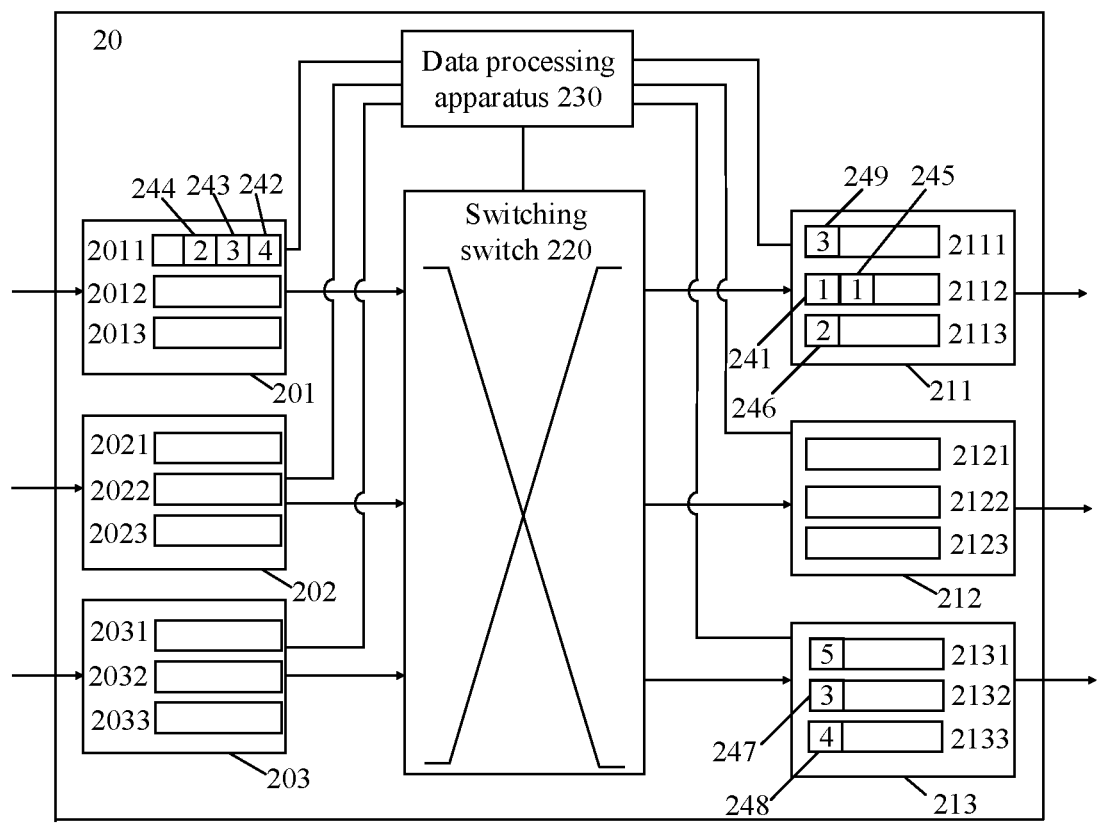
FIG. 10 is a schematic diagram of an apparatus structure of a switching device after forwarding a data packet according to an embodiment of the present disclosure.

Further, in the following, FIG. 9 and FIG. 10 show scenarios in which there is no non-busy queue on an available output port when network blocking occurs. FIG. 9 is a schematic diagram of an apparatus structure of a switching device before forwarding a data packet 241 according to an embodiment of the present disclosure. FIG. 10 is a schematic diagram of an apparatus structure of a switching device after forwarding a data packet 241 according to an embodiment of the present disclosure.

As shown in FIG. 9, the data processing apparatus 230 obtains a destination address 1 of the data packet 241 from a queue 211, and obtains available output ports 211 and 213 by calculating a route based on the destination address 1. The data processing apparatus 230 obtains that on the available output port 211, a quantity of non-busy queues is 0 and a quantity of footprint queues is 1, and obtains that on the available output port 213, a quantity of non-busy queues is 0 and a quantity of footprint queues is 0.

According to a procedure shown in FIG. 4, because the quantity of non-busy queues being 0 on the available output port 211 is the same as the quantity of non-busy queues being 0 on the available output port 213, the data processing apparatus 230 determines that there are at least two available output ports with a largest quantity of busy queues. In this case, the data processing apparatus 230 further determines that the quantity of footprint queues being 1 on the available output port 211 is different from the quantity of footprint queues being 0 on the available output port 213. Because the quantities of footprint queues are different, the data processing apparatus 230 selects the available output port 211 with a largest quantity of footprint queue as a target output port.

Further, according to a procedure shown in FIG. 6, the data processing apparatus 230 determines whether a percentage of the quantity of non-busy queues being 0 on the target output port 211 in a total quantity of queues being 3 on the target output port is greater than a first threshold 50%. Because 0 is less than 50%, the data processing apparatus 230 further determines whether there is a non-busy queue on the target output port 211. Because there is no non-busy queue on the target output port 211, the data processing apparatus 230 further determines whether there is a footprint queue on the target output port. Because there is a footprint queue 22112 on the target output port 211, the footprint queue 2112 is selected as a target output queue. The data processing apparatus 230 sends a port number 1 and a queue number 2 of the target output queue 2112 to the switching device 220. The switching device 220 sends the data packet 241 located at a queue head of the queue 2011 on an input port 201 to the target output queue 2112 based on the port number 1 and the queue number 2. A status of the switching device after sending the data packet 241 is shown in FIG. 10.

In this embodiment, when there is no non-busy queue on the available output port, the available output port with the largest quantity of footprint queues is selected as the target output port, and the footprint queue is selected from the target output port to send the data packet. Because a last data packet of the footprint queue is the same as the destination address of the to-be-forwarded data packet, even if blocking occurs in the footprint queue, forwarding of a data packet destined for another destination address on the input port is not affected. Therefore, network blocking can be effectively alleviated.

Figure 11:
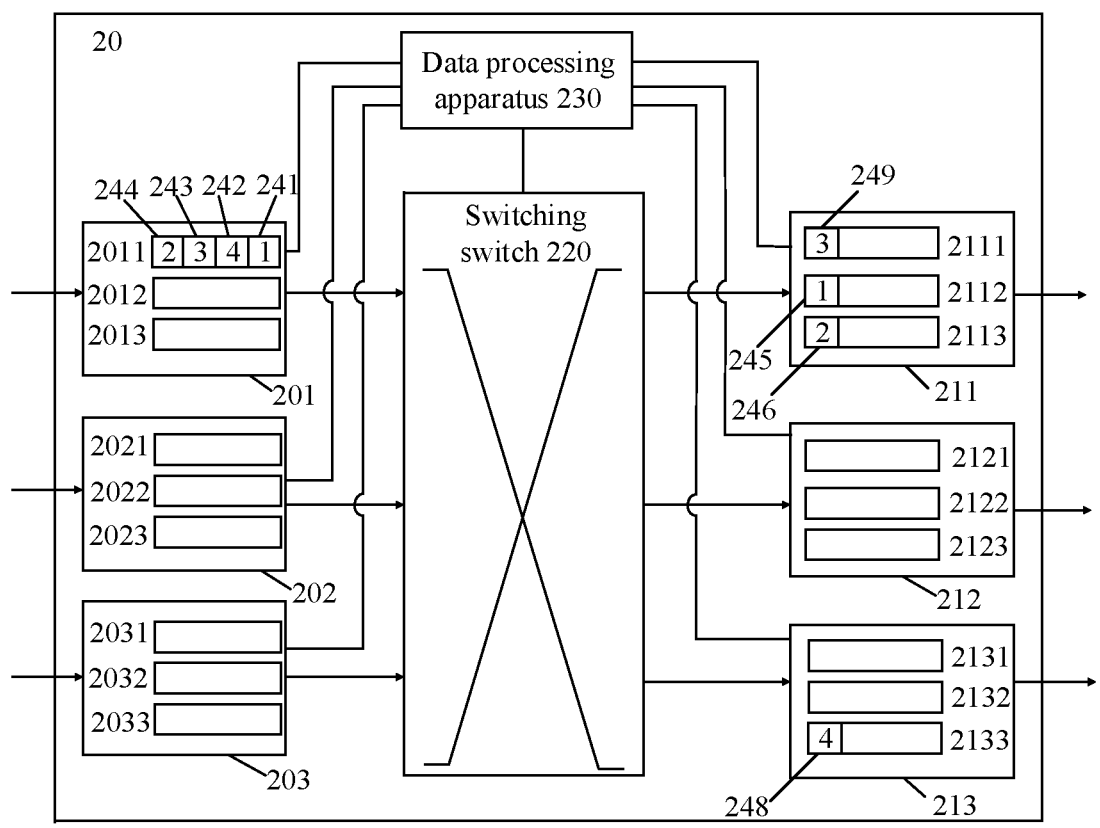
FIG. 11 is another schematic diagram of an apparatus structure of a switching device before forwarding a data packet according to an embodiment of the present disclosure.
Figure 12:
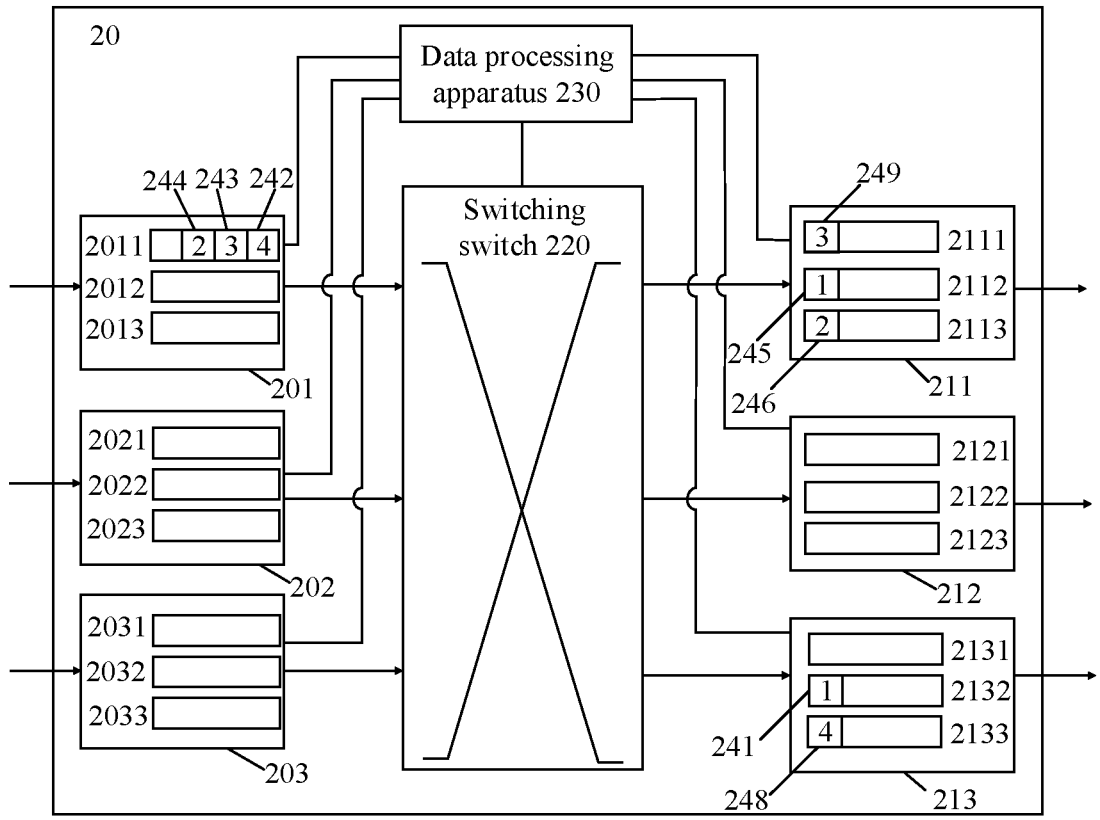
FIG. 12 is another schematic diagram of an apparatus structure of a switching device after forwarding a data packet according to an embodiment of the present disclosure.

In the following, FIG. 11 and FIG. 12 show scenarios in which there is a non-busy queue on an available output port when network blocking does not occur. FIG. 11 is another schematic diagram of an apparatus structure of a switching device before forwarding a data packet 241 according to an embodiment of the present disclosure. FIG. 12 is another schematic diagram of an apparatus structure of a switching device after forwarding a data packet 241 according to an embodiment of the present disclosure.

As shown in FIG. 11, the data processing apparatus 230 obtains a destination address 1 of the data packet 241 from a queue 211, and obtains available output ports 211 and 213 by calculating a route based on the destination address 1. The data processing apparatus 230 obtains that on the available output port 211, a quantity of non-busy queues is 0 and a quantity of footprint queues is 1, and obtains that on the available output port 213, a quantity of non-busy queues is 2 and a quantity of footprint queues is 0.

According to a procedure shown in FIG. 5, because the quantity of non-busy queues being 0 on the available output port 211 is different from the quantity of non-busy queues being 2 on the available output port 213, the data processing apparatus 230 determines that there are less than two available output ports with a largest quantity of non-busy queues. In this case, the data processing apparatus 230 selects the available output port 213 with the largest quantity of non-busy queues as a target output port.

Further, according to a procedure shown in FIG. 6, the data processing apparatus 230 determines whether a percentage of a quantity of non-busy queues being 2 on the target output port 213 in a total quantity of queues being 3 on the target output port 213 is greater than a first threshold 50%. Because ⅔ is greater than 50%, the data processing apparatus 230 selects any non-busy queue (2131 or 2132) as a target output queue.

Assuming that the data processing apparatus 230 selects the non-busy queue 2132 as the target output queue, the data processing apparatus 230 sends a port number 3 of the target output port and a queue number 2 to the switching device 220. The switching device 220 sends the data packet 241 a data packet located at a queue hea of in the queue 2011 on an input port 201 to the target output queue 2132 based on the port number 3 and the queue number 2. A status of the switching device after sending the data packet 241 is shown in FIG. 12.

In this embodiment, the available output port with the largest quantity of non-busy queues is selected as the target output port, and the non-busy queue is selected from the target output port as the target output queue. Because blocking does not occur in the non-busy queue, network blocking can be effectively alleviated.

Figure 13:
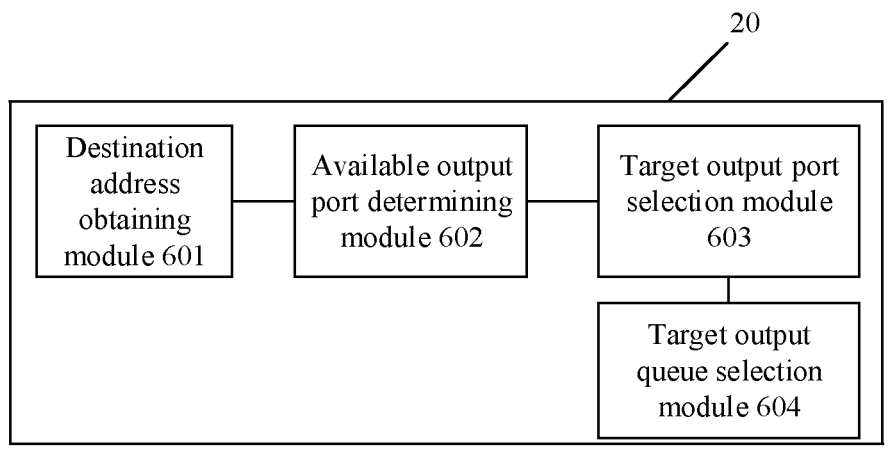
FIG. 13 is a schematic diagram of an apparatus structure of a data processing apparatus according to an embodiment of the present disclosure.

In the following, FIG. 13 is a schematic diagram of an apparatus structure of a data processing apparatus according to an embodiment of the present disclosure. As shown in FIG. 13, the data processing apparatus 20 includes:

a destination address obtaining module 601, configured to obtain a destination address of a data packet received by an input port;

an available output port determining module 602, configured to determine an available output port based on the destination address;

a target output port selection module 603, configured to: determine a busy degree of each available output port, and when there is a non-busy available output port in the available output port, select the non-busy available output port as a target output port; and a target output queue selection module 604, configured to: determine a busy degree of each queue on the target output port, and when there is no non-busy queue on the target output port, select a footprint queue on the target output port as a target output queue, where a destination address of a data packet at a queue tail of the footprint queue is the same as the destination address of the received data packet.

Optionally, the target output port selection module 603 is further configured to:

when there is no non-busy available output port in the available output port, determine a quantity of footprint queues on each available output port, and selecting an available output port with a largest quantity of footprint queues as the target output port.

Optionally, the target output queue selection module 604 is further configured to:

when there is a non-busy queue on the target output port, select the non-busy queue as the target output queue.

Optionally, the target output port selection module 603 is further configured to:

determine a quantity of footprint queues on the non-busy available output port, and select a non-busy available output port with a largest quantity of footprint queues as the target output port.

Optionally, the target output port selection module 603 is further configured to:

determine a quantity of data packets or remaining bandwidth on the non-busy available output port with the largest quantity of footprint queues, and select a non-busy available output port with a smallest quantity of data packets or largest remaining bandwidth as the target output port.

Optionally, the target output port selection module 603 is configured to:

determine a quantity of non-busy queues on each available output port, obtain a percentage of the quantity of non-busy queues on each available output port in a total quantity of queues on each available output port, and when the percentage is greater than a first threshold, determine that the current available output port is a non-busy available output port.

Optionally, the target output queue selection module 604 is configured to:

determine a cache space of a data packet in each queue, and when a percentage of the cache space occupied by the data packet to a cache capacity of the queue is not greater than a second threshold, determine that the current queue is a non-busy queue.

Figure 14:
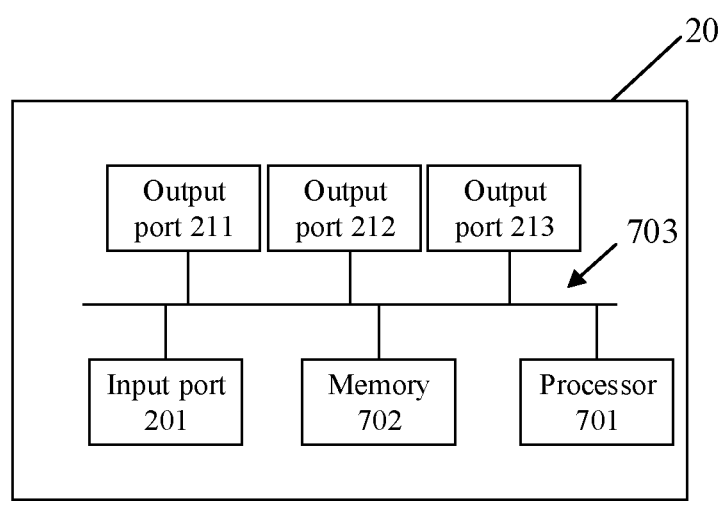
FIG. 14 is a schematic diagram of an apparatus structure of a switching device according to an embodiment of the present disclosure.

An embodiment of the present disclosure further provides a switching device. FIG. 14 is a schematic diagram of an apparatus structure of the switching device according to an embodiment of the present disclosure. As shown in FIG. 14, the switching device includes an input port 201, output ports 211, 212, and 213, a processor 701, a memory 702, and a bus 703. The input port 201, the output ports 211, 212, and 213, the processor 701, and the memory 702 each are connected to the bus 703. The memory 702 stores a program instruction, and the processor 701 runs the program instruction to perform the steps shown in FIG. 3.

This embodiment of the present disclosure may be applied to all lossless networks including a data center network, a high-performance computer interconnection network, and a multi-core processor network-on-chip. When network blocking occurs, a data packet may be required to move ahead along a footprint queue, to effectively reduce a probability of blocking. When network blocking does not occur, a non-busy queue is preferably selected, to improve network performance. An experimental result indicates that a network saturation throughput rate can be increased by about 50% at most.

The data processing apparatus in this embodiment of the present disclosure may be implemented by using a multi-core processor chip and a network switching chip.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

It may be clearly understood by a person skilled in the art that, for a detailed working process of the foregoing system, apparatus, and unit, refer to a corresponding process in the foregoing method embodiments, and details are not described herein again.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
receiving a data packet carrying a destination address by an input port;
determining a plurality of available output ports based on the destination address;
determining there is no non-busy available output port in the plurality of available output ports;
selecting an available output port with a largest quantity of footprint queues as a target output port from the plurality of available output ports, wherein a destination address of a data packet at a queue tail of the footprint queue is the same as the destination address of the received data packet;
selecting a non-busy queue on the target output port as a target output queue;
sending the data packet to the target output queue on the target output port.

2. The method according to claim 1, wherein the determining there is no non-busy available output port in the plurality of available output ports comprises:
determining a quantity of non-busy queues on each of the plurality of available output ports, obtaining a percentage of the quantity of non-busy queues in a total quantity of queues on each of the plurality of available output ports, determining that there is no available output port with a percentage which is greater than a first threshold.

3. The method according to claim 1, wherein the determining there is no non-busy available output port in the plurality of available output ports comprises:
determining there is no non-busy queues on each of the plurality of available output ports.

4. The method according to claim 1, wherein the selecting a non-busy queue on the target output port as a target output queue comprises:
determining a cache space occupied by a data packet in the queue, and when a percentage of the cache space occupied by the data packet to a cache capacity of the queue is not greater than a second threshold, determining that the queue is a non-busy queue.

5. A data processing method, comprising:
receiving a data packet carrying a destination address by an input port;
determining a plurality of available output ports based on the destination address;
determining there is no non-busy available output port in the plurality of available output ports;
selecting an available output port with a largest quantity of footprint queues as a target output port from the plurality of available output ports, wherein a destination address of a data packet at a queue tail of the footprint queue is the same as the destination address of the received data packet;
selecting a footprint queue on the target output port as the target output queue;
sending the data packet to the target output queue on the target output port.

6. The method according to claim 5, wherein the determining there is no non-busy available output port in the plurality of available output ports comprises:
determining a quantity of non-busy queues on each of the plurality of available output ports, obtaining a percentage of the quantity of non-busy queues in a total quantity of queues on each of the plurality of available output ports, determining that there is no available output port when there is no percentage which is greater than a first threshold.

7. The method according to claim 5, wherein the determining there is no non-busy available output port in the plurality of available output ports comprises:
determining there is no non-busy queue on each of the plurality of available output ports.

8. The method according to claim 5, wherein before the selecting a non-busy queue on the target output port as a target output queue, the method comprises:
determining a cache space occupied by a data packet in the queue, and when a percentage of the cache space occupied by the data packet to a cache capacity of the queue in each queue of the target output port is greater than a second threshold, determining that there is no non-busy queue in the target output port.

9. A switching device, comprising an input port, output ports, a processor, a memory, and a bus, wherein the input port, the output ports, the processor, and the memory each are connected to the bus, the memory stores a program instruction, and the processor runs the program instruction to perform the following steps:
receiving a data packet carrying a destination address by an input port;
determining a plurality of available output ports based on the destination address;
determining there is no non-busy available output port in the plurality of available output ports;
selecting an available output port with a largest quantity of footprint queues as the target output port from the plurality of available output ports, wherein a destination address of a data packet at a queue tail of the footprint queue is the same as the destination address of the received data packet;
selecting a non-busy queue on the target output port as a target output queue;
sending the data packet to the target output queue on the target output port.

10. The switching device according to claim 9, wherein the processor runs the program instruction to perform the following steps:

determining a quantity of non-busy queues on each of the plurality of available output ports, obtaining a percentage of the quantity of non-busy queues in a total quantity of queues on each of the plurality of available output ports, determining that there is no available output port with a percentage which is greater than a first threshold.

11. The switching device according to claim 9, wherein the processor runs the program instruction to perform the following step:
determining there is no non-busy queues on each of the plurality of available output ports.

12. The switching device according to claim 9, wherein the processor runs the program instruction to perform the following steps:
determining a cache space occupied by a data packet in the queue, and when a percentage of the cache space occupied by the data packet to a cache capacity of the queue is not greater than a second threshold, determining that the queue is a non-busy queue.

13. A switching device, comprising an input port, output ports, a processor, a memory, and a bus, wherein the input port, the output ports, the processor, and the memory each are connected to the bus, the memory stores a program instruction, and the processor runs the program instruction to perform the following steps:
receiving a data packet carrying a destination address by an input port;
determining a plurality of available output ports based on the destination address;
determining there is no non-busy available output port in the plurality of available output ports;
selecting an available output port with a largest quantity of footprint queues as a target output port from the plurality of available output ports, wherein a destination address of a data packet at a queue tail of the footprint queue is the same as the destination address of the received data packet;
selecting a footprint queue on the target output port as the target output queue;
sending the data packet to the target output queue on the target output port.

14. The switching device according to claim 13, wherein the processor runs the program instruction to perform the following steps:
determining a quantity of non-busy queues on each of the plurality of available output ports, obtaining a percentage of the quantity of non-busy queues in a total quantity of queues on each of the plurality of available output ports, determining that there is no available output port with a percentage which is greater than a first threshold.

15. The switching device according to claim 13, wherein the processor runs the program instruction to perform the following step:
determining there is no non-busy queues on each of the plurality of available output ports.

16. The switching device according to claim 13, wherein the processor runs the program instruction to perform the following steps:
determining a cache space occupied by a data packet in the queue, and when a percentage of the cache space occupied by the data packet to a cache capacity of the queue in each queue of the target output port is greater than a second threshold, determining that there is no non-busy queue in the target output port.

* * * * *